May 21, 1929.  G. JAEGER  1,713,532
BODY LEVELING DEVICE
Filed May 25, 1923

Inventor
GEBHARD JAEGER his Attorneys

Patented May 21, 1929.

1,713,532

UNITED STATES PATENT OFFICE.

GEBHARD JAEGER, OF COLUMBUS, OHIO.

BODY-LEVELING DEVICE.

Application filed May 25, 1923. Serial No. 641,338.

The larger forms of concrete mixing machines mounted on transporting trucks are provided with a loader hinged to the frame of the machine. As such loaders in their movements occupy extended positions beyond the machine great strains are imposed upon the connections between the frame of the machine and the truck. The object of the present invention is therefore to provide simple, economical and easily operated means whereby the frame of the machine is braced with respect to the truck so as to prevent wholly or in very large measure the strains referred to.

The invention is embodied in the example herein shown and described, the features of novelty being finally claimed.

In the accompanying drawing—

Figure 1:
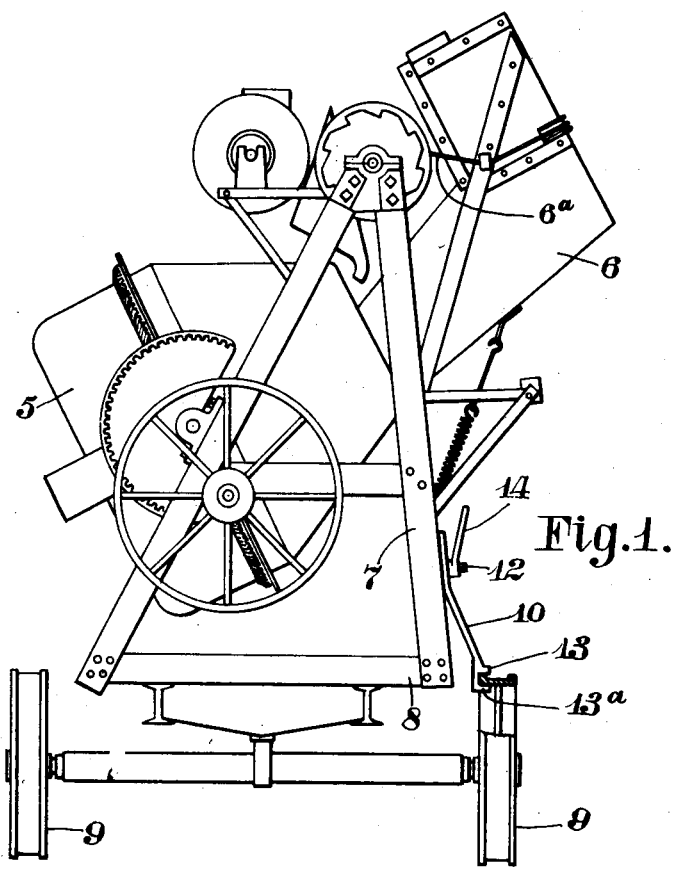
Figure 1 is an elevation partly in section showing a concrete mixing machine with a loader in the drum charging position, and illustrating my present invention applied thereto.
Figure 2:
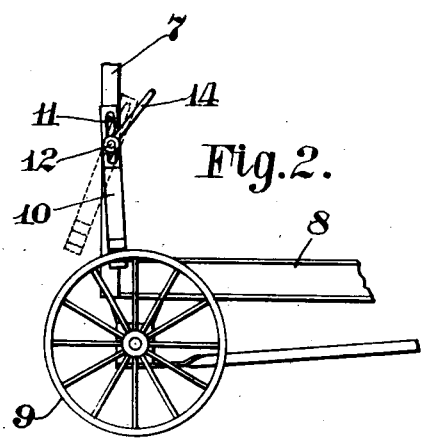
Fig. 2 is a detail of my invention as viewed from the right hand side of Fig. 1.

In the views 5 designates the mixing drum, 6 the loader or bucket and 7 the frame on which the drum and loader are mounted. The frame, as usual in such machines, is mounted upon a truck or chassis 8 which includes transport wheels 9 usually 4 in number. The drum is equipped with means for turning it and for swinging it from charging to discharging position and the loader is equipped with a cable 6ª and means for operating it to raise and lower the bucket from the ground to its discharging position as shown in Fig. 1. Secured on the frame 7 is a bar 10 slotted at its upper end, as shown at 11, to receive a threaded bolt 12 fixed in the frame 11. The lower end of the bar 10 is formed with jaws 13, and 13ª adapted to engage the rim of the wheel 9, the jaw 13 engaging the outer side and the jaw 13ª engaging the inner side of the rim. When the jaws 13 and 13ª have been placed as shown the bar is clamped tightly in position on the frame by means of a handled nut 14. In this position the bar forms a brace adapted to hold in rigid position the frame with reference to the truck and so that the operation of the loader will not impose undue strains on the connections between the frame and the truck. Incidentally the bar 10 in the position shown prevents the wheel from turning and the machine from changing its position. After completing a job at a particular place and it is desired to transport the machine to another the bar 10 is released by turning the handled nut backward sufficiently for the purpose and the jaws removed from the rim of the wheel and turned to a position, say as indicated by broken lines Fig. 2 where it is again fastened after which the wheel is free to turn. It is not indispensable that the jaw 13ª be used because the principal stress on the bar 10 is downward on the outer side of the rim.

The forms of the parts can be changed without departing from the gist of the invention as claimed.

What I claim is:

Means for locking the bed of a wheeled vehicle consisting of a single brace bar having at one end a pair of jaws, one of which jaws is adapted to engage the upper side of the rim of one of the wheels of the vehicle and the other of which jaws is adapted to engage the lower side of said rim and means at the other end of said bar for securing it to said bed and thereby prevent longitudinal movement thereof in relation to said bed and wheels.

GEBHARD JAEGER.